United States Patent
Pion

(10) Patent No.: US 11,700,784 B1
(45) Date of Patent: Jul. 18, 2023

(54) SOIL CONDITIONER INJECTION SYSTEMS AND METHODS OF USING THE SAME

(71) Applicant: Roger Pion, Barton, VT (US)

(72) Inventor: Roger Pion, Barton, VT (US)

( * ) Notice: Subject to any disclaimer, the term of this patent is extended or adjusted under 35 U.S.C. 154(b) by 569 days.

(21) Appl. No.: 15/930,805

(22) Filed: May 13, 2020

Related U.S. Application Data

(60) Provisional application No. 62/848,302, filed on May 15, 2019.

(51) Int. Cl.
*A01C 23/02* (2006.01)
*A01C 21/00* (2006.01)
*A01C 5/04* (2006.01)

(52) U.S. Cl.
CPC .............. *A01C 23/026* (2013.01); *A01C 5/045* (2013.01); *A01C 21/00* (2013.01)

(58) Field of Classification Search
CPC ... A01C 5/02; A01C 5/04; A01C 5/045; A01C 21/00; A01C 21/002; A01C 23/021; A01C 23/026
See application file for complete search history.

(56) References Cited

U.S. PATENT DOCUMENTS

| | | | | |
|---|---|---|---|---|
| 3,659,536 A | * | 5/1972 | White | A01G 29/00 175/21 |
| 3,943,863 A | * | 3/1976 | Leonard et al. | A01C 5/045 111/89 |
| 4,231,434 A | | 11/1980 | Justus | |
| 4,592,294 A | | 6/1986 | Dietrich, Sr. et al. | |
| 4,800,827 A | * | 1/1989 | Smith | A01C 23/026 111/97 |
| 4,825,959 A | | 5/1989 | Wilhelm | |
| 4,889,192 A | | 12/1989 | Ricard | |
| 4,903,618 A | * | 2/1990 | Blair | A01C 23/026 111/93 |
| 4,906,049 A | | 3/1990 | Anderson | |
| 5,115,750 A | * | 5/1992 | White et al. | A01B 45/023 172/21 |

(Continued)

FOREIGN PATENT DOCUMENTS

| | | | | |
|---|---|---|---|---|
| CN | 107690881 | * | 2/2018 | A01C 5/04 |
| KR | 20080082335 A | | 9/2008 | |

OTHER PUBLICATIONS

Cornell University Cooperative Extension, Agronomy Fact Sheet Series, "Liquid Manure Injection." (2015).
https://bambauerequipment.com/2013/01/nuhn-spike-injector (Last viewed on May 4, 2020).

(Continued)

*Primary Examiner* — Thomas B Will
*Assistant Examiner* — Ian A Normile
(74) *Attorney, Agent, or Firm* — Downs Rachlin Martin PLLC

(57) ABSTRACT

Soil conditioner injection systems that can provide a variety of benefits, including the fast and efficient amendment of soil with soil conditioner without requiring tillage and in a manner that significantly reduces or eliminates any inadvertent runoff of the soil conditioner, for example, from rain. In some examples the soil conditioner injection systems of the present disclosure include soil conditioner injectors that include a soil plug remover configured to remove a first volume of soil from a first location and a sleeved hammer configured to form a recess in soil and inject soil conditioner into the recess.

16 Claims, 5 Drawing Sheets

(56) References Cited

U.S. PATENT DOCUMENTS

| | | | |
|---|---|---|---|
| 5,682,829 | A | 11/1997 | Sukup |
| 5,802,996 | A * | 9/1998 | Baxter ................ A01C 23/026 172/21 |
| 5,865,131 | A | 2/1999 | Dietrich, Sr. et al. |
| 6,973,884 | B2 | 12/2005 | Dietrich, Sr. et al. |
| 6,997,121 | B2 | 2/2006 | Buchholtz |
| 7,150,238 | B1* | 12/2006 | Kontorovich et al. ... A01C 5/02 172/378 |
| 2007/0221105 | A1* | 9/2007 | Allan et al. ............ A01G 29/00 111/123 |
| 2011/0110726 | A1 | 5/2011 | Plahert |
| 2015/0327432 | A1* | 11/2015 | Kim ..................... A01C 7/002 111/99 |
| 2020/0060069 | A1* | 2/2020 | Larson, Sr. .............. A01C 7/02 |

OTHER PUBLICATIONS https://www.bourgault.com/product/en-US/fertilizer-application-systems/48/lmi1000-liquid-manure-injector_aspx (Last viewed on May 4, 2020).

Maguire et al., "Manure Injection In No-Till and Pasture Systems," Virginia Cooperative Extension, Virginia Tech, Publication CSES-22P (2018).

* cited by examiner

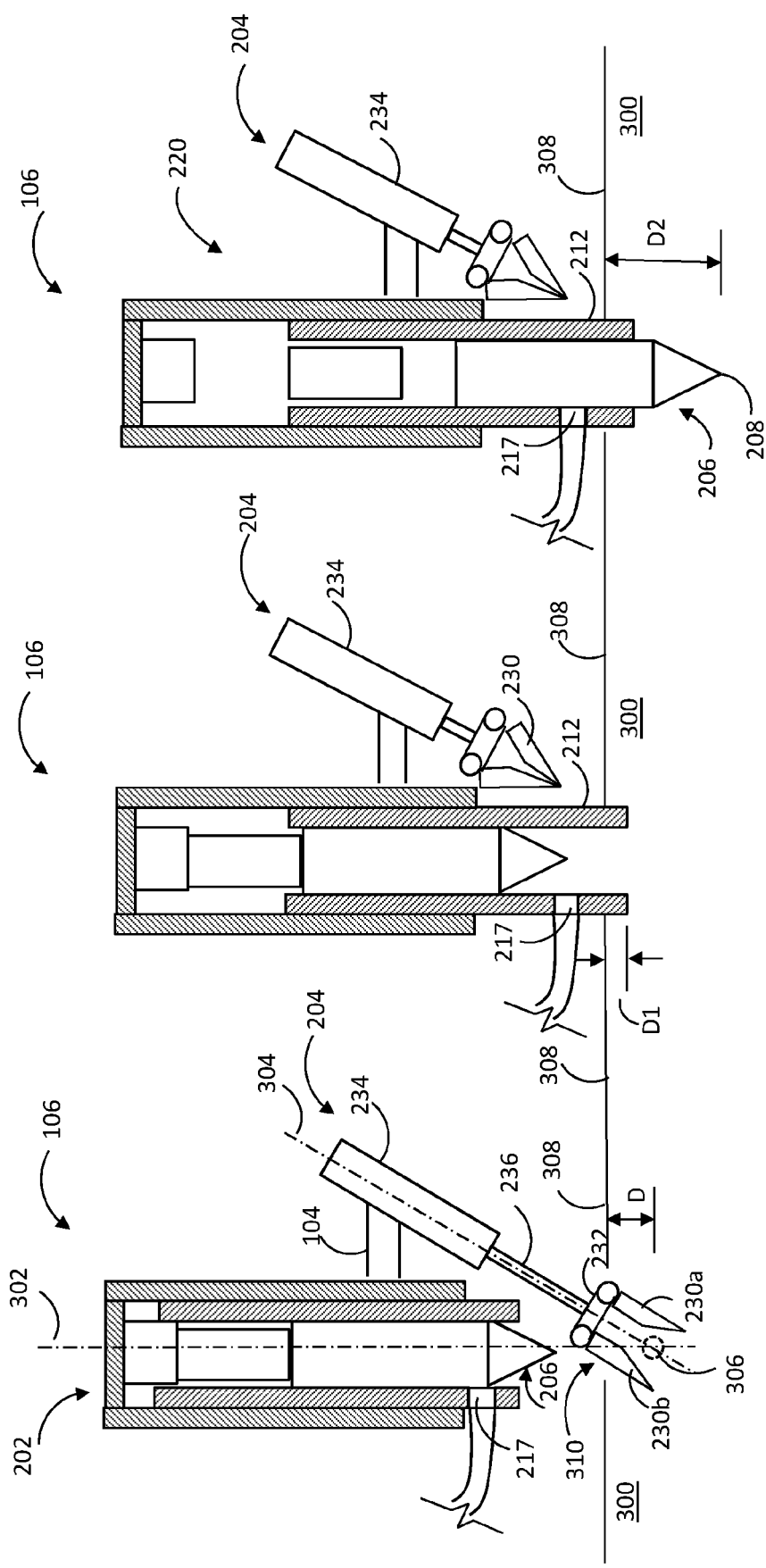

SOIL CONDITIONER INJECTION SYSTEMS AND METHODS OF USING THE SAME

RELATED APPLICATION DATA

This application claims the benefit of priority of U.S. Provisional Pat. Application Serial No. 62/848,302, filed on May 15, 2019, and titled "Soil Conditioner Injection Systems and Methods of Using the Same," which is incorporated by reference herein in its entirety.

FIELD OF THE INVENTION

The present invention generally relates to the field of soil conditioner application systems. In particular, the present invention is directed soil conditioner injection systems and methods of using the same.

BACKGROUND

Soil conditioners, such as manure and other fertilizers, are commonly used in agriculture to add nutrients to soil to promote plant growth. Liquid manure spreaders are commonly used in industrial agriculture and typically include a soil conditioner slurry tank that holds a solid-liquid slurry of soil conditioner, such as manure. The soil conditioner is typically sprayed onto the surface of the soil.

It is well known, however, that waterways around the world are being severely damaged by surface runoff of soil conditioners from agricultural operations. The resulting excess nitrogen and phosphorus that reaches waterways can lead to eutrophication of the water bodies, excess growth of plant life, and the resulting death of animal life due to the lack of oxygen. Excess nutrients can also cause harmful algal blooms in freshwater systems, which can disrupt wildlife and also produce toxins harmful to humans and animals.

SUMMARY OF THE DISCLOSURE

In one implementation, the present disclosure is directed to a soil conditioner injector. The soil conditioner injector includes a sleeve having a longitudinal axis, the sleeve slidably configured to move between a retracted position and an extended position for insertion into soil; a tool slidably disposed in the sleeve; a driving mechanism configured to drive the tool in a direction parallel to the longitudinal axis to form a recess in the soil; and wherein the sleeve is configured to convey pressurized soil conditioner into the recess formed in the soil.

In another implementation, the present disclosure is directed to a system. The system includes at least one soil conditioner injector, including: a soil plug remover (SPR) configured to remove a first volume of soil from a first location; and a sleeved hammer configured to form a recess in soil at the first location and inject soil conditioner into the recess; and wherein the SPR is configured to deposit the first volume of soil on the injected soil conditioner to thereby substantially seal the soil conditioner in the recess.

In yet another implementation, the present disclosure is directed to a method of injecting soil conditioner into soil. The method includes inserting a sleeve of a sleeved hammer into soil at a first location; driving a tool located within the sleeve into the soil to form a recess; and retracting the tool towards a proximal end of the sleeve; and injecting soil conditioner through the sleeve and into the recess.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein:

FIGS. 3A-3E illustrate steps a soil conditioner injection operation performed the soil conditioner injector of FIG. 2.

DETAILED DESCRIPTION

The present disclosure includes soil conditioner injection systems that can provide a variety of benefits, including the fast and efficient amendment of soil with soil conditioner without requiring tillage and in a manner that significantly reduces or eliminates any inadvertent runoff of the soil conditioner, for example, from rain.

Figure 1:
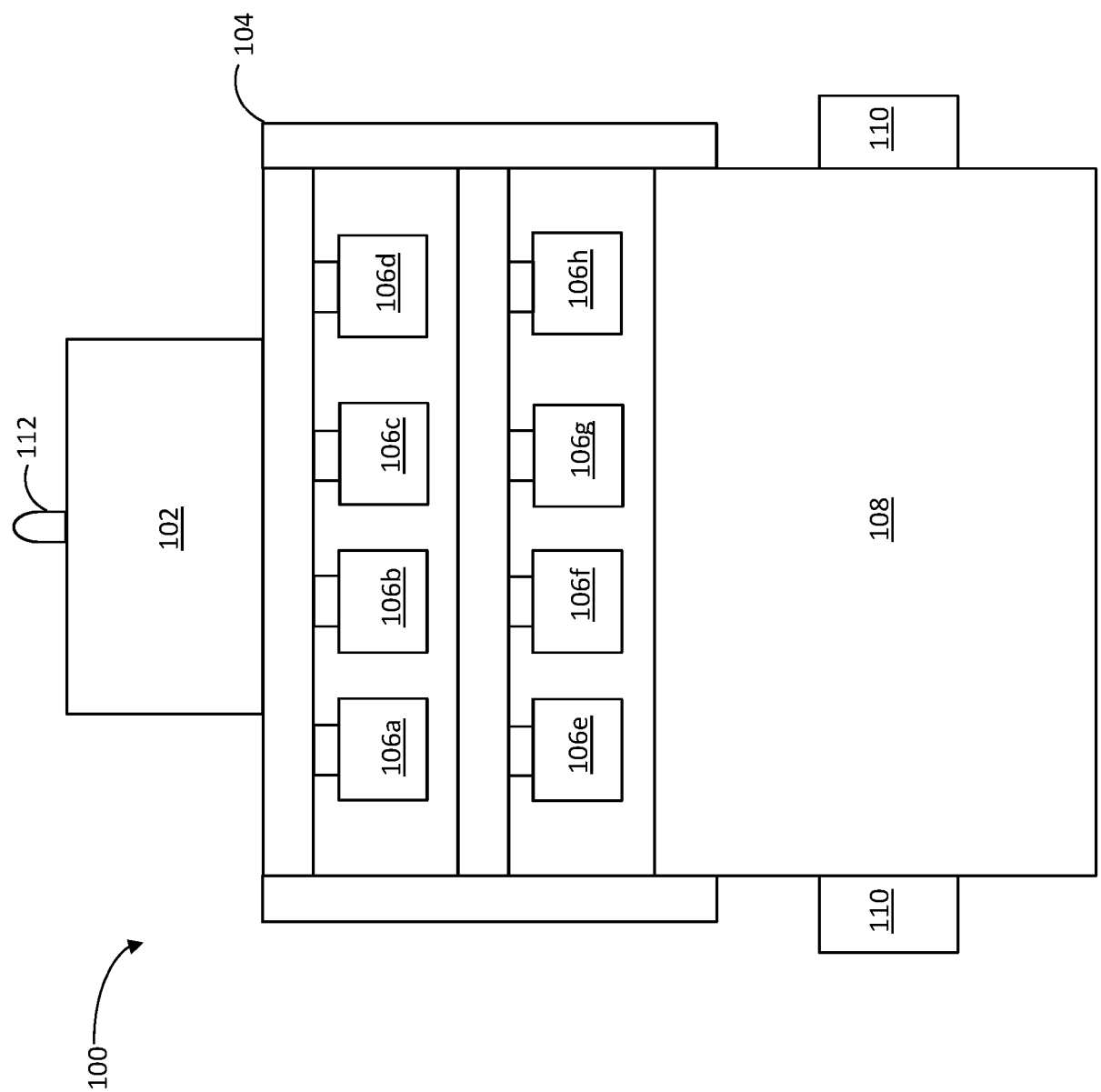
FIG. 1 is a top view of a soil conditioner injection system.

FIG. 1 illustrates an example soil conditioner injection system 100 made in accordance with the present disclosure. System 100 includes a soil conditioner slurry tank 102 supported by a frame 104. System 100 also includes a plurality of injectors 106a-106h that, as described more below, are configured to inject soil conditioner into soil. Each of the injectors 106 are fluidly connected to slurry tank 102 by a hose (not shown). Slurry tank 102 includes a mixing element (not shown) as is common with prior art slurry tanks to prevent caking or solidification of the soil conditioner, and also includes a pump (not shown) for transporting pressurized soil conditioner through the hoses to each of the injectors 106. System 100 also includes a sled 108 that is supported by wheels 110. System 100 is configured to be coupled to a vehicle, such as a tractor (not shown) at hitch 112 for transporting the system across an area of soil for amendment. As will be appreciated, although two rows of four injectors are shown, this is for illustrative purposes only and soil conditioner injection systems made in accordance with the present disclosure may have any number of injectors 106. Any soil conditioner known in the art may be transported in slurry tank 102 and injected by injectors 106. For example, any combination of one or more of biochar, bone meal, blood meal, coffee grounds, compost, compost tea, coir, manure, straw, peat, sphagnum moss, vermiculite, sulfur, lime, hydroabsorbant polymers, biosolids, gypsum, clay, and chemical fertilizers, etc.

Figure 2:
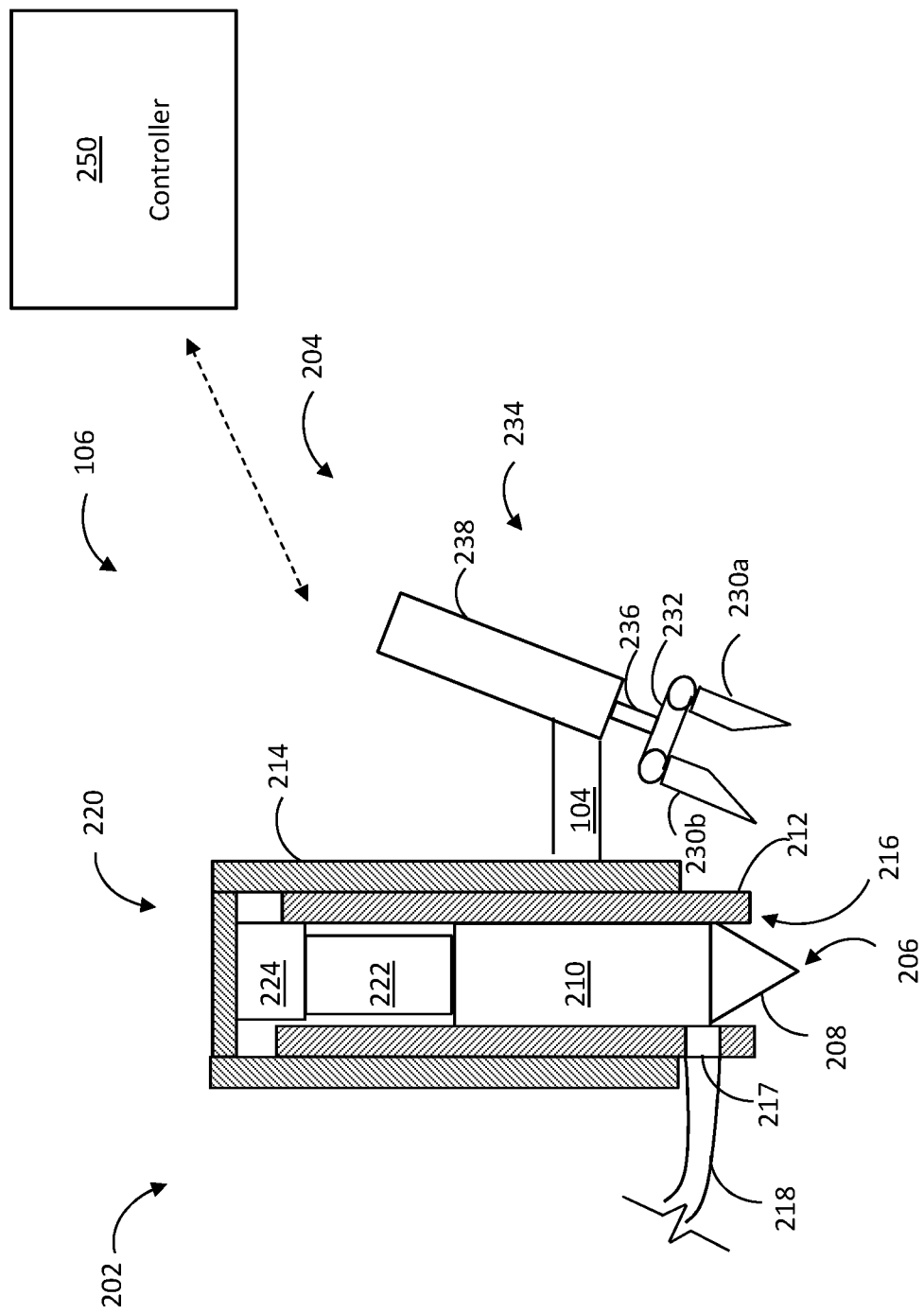
FIG. 2 is a partial cross-sectional elevational view of one of the soil conditioner injectors of the system of FIG. 1.

FIG. 2 is a partial cross-sectional elevational view of one of injectors 106. As shown, in the illustrated example, injector 106 includes a sleeved hammer 202 for forming a recess in soil and a soil plug remover (SPR) 204 for removing a plug of soil. Both sleeved hammer 202 and SPR 204 are coupled to and supported by frame 104, (only a portion of which is illustrated in FIG. 2). Sleeved hammer 202 includes a tool 206 having a distal end 208 configured to be driven into soil and an elongate shaft 210. Tool 206 is slidably disposed within a sleeve 212 and the sleeve is slidably disposed in a housing 214. As will be described more below, sleeved hammer 202 is configured to move sleeve 212 from a retracted position within housing, as shown in FIG. 2, to an extended position so that a distal end 216 of the sleeve is inserted into soil. Sleeved hammer 202 can include any driving mechanism known in the art, such as a geared mechanism driven by an electric motor, for moving sleeve 212 between the retracted and extended positions.

A soil conditioner hose 218 may be coupled to an opening 217 in a sidewall of sleeve 212 to transport pressurized soil conditioner from slurry tank 102 (FIG. 1) through the sleeve and into the soil. Sleeved hammer 202 also includes a driving mechanism 220 for driving tool 206 into soil. Any of a variety of driving mechanisms known in the art may be used, such as driving mechanisms commonly used for breakers or jackhammers. In the illustrated example, driving mechanism 220 includes a hammer 222 and a force generator 224 for driving the hammer against a proximal end of tool 206 to thereby drive distal end 208 of the tool into soil. Force generator 224 may be actuated and/or driven mechanically, electrically, and/or hydraulically.

In the illustrated example, SPR 204 includes a pair of spades 230a, 230b, that are each pivotally coupled to a closing mechanism 232, the rotational driving mechanism configured to move the spades between an open position as shown in FIG. 2, and a closed position to define a soil plug enclosure and retain a plug of soil therein. In other examples, SPRs having alternate configurations may be used. More generally, an SPR made in accordance with the present disclosure may have at least a first portion configured to be inserted into soil, and may be configured to transition between a first position for insertion into soil, and a second position, where a first volume of soil is captured within a cavity for removal from the ground. In other examples, SPRs may only have one spade that is moveable between an open and closed position, the one spade operably coupled to a recess for forming an enclosure for capturing and containing a first volume of soil. In one example, the SPR may include a pair of opposed spades configured to be inserted into soil, articulating arms coupled to the spades, and an actuator configured to move the articulating arms between first and second positions to thereby open and close the spades.

SPR 204 also includes a linear actuator 234, which may include an elongate member 236 slidably disposed in a housing 238. Linear actuator 234 is configured to move elongate member 236 between a retracted position as shown in FIG. 2 and an extended position to insert spades 230 into soil. Linear actuator 234 and closing mechanism 232 may be driven by any a variety of mechanisms known in the art, for example, linear actuator may be a hydraulic cylinder that is operatively coupled to a pressurized hydraulic system of a tractor pulling system 100, or the linear actuator may be driven by electrical power. Closing mechanism 232 may similarly be powered by any of a variety of mechanisms, such being hydraulically driven or driven by one or more electric motors. Injector 106 may be in communication or otherwise controlled by at least one controller 250. As will be described more below, the various components of injector 106 can be controlled in a sequence of operations to inject soil conditioner into soil. Such operations may be fully automated and controlled by controller 250. Controller 250 may have any of a variety of configurations, depending on the specific components of injector 106. For example, in some embodiments, one or more of sleeve 212, force generator 224, linear actuator 234, and closing mechanism 232 may be hydraulically powered and controller 250 may include a hydraulic control system for automatically controlling each of the injectors to each perform an injection operation substantially simultaneously. In other examples where one or more of the components of injector 106 are electrically powered, controller 250 may include computational and wired and wireless communication modules known in the art for controlling such electrical components.

Figure 3E:
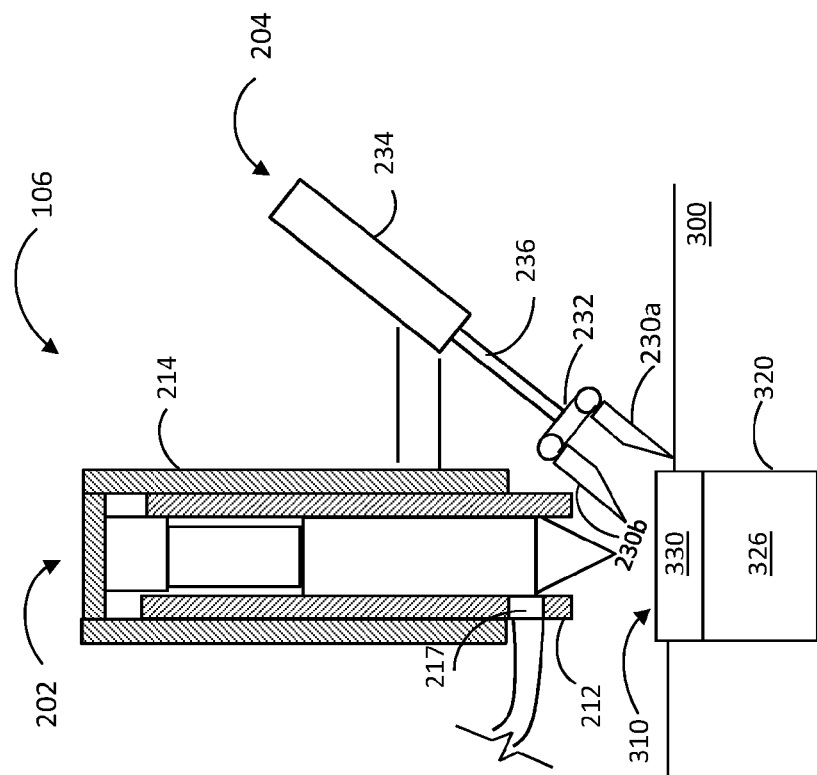

FIGS. 3A-3E illustrate an example method of operating injector 106 to inject soil conditioner into soil. As shown in FIG. 3A, injector 106 is suspended above soil 300 by frame 104, and FIG. 3A shows SPR 204 in an extended position with spades 230 inserted into the soil. As shown in FIG. 3A, hammer 202 is supported by frame 104 in a vertical orientation such that a central longitudinal axis 302 of tool 206 is substantially perpendicular to the soil. SPR 204 is coupled to frame 104 at an angle with respect to hammer 202, such that a central longitudinal axis 304 of the SPR is not parallel with central longitudinal axis 302 of tool 206 and instead the axis 302, 304 intersect at an intersection point 306. In the illustrated example, intersection point 306 is proximate a surface 308 of soil 300, for example, intersection point may be at a depth, D, below the surface of the soil, wherein D may be in the range of 0″ to 12″ and in some examples, in the range 0″ to 8″, and in some examples, in the range 0″ to 6″ and in some examples, in the range 0″ to 4″ and in some examples, in the range 0″ to 2″ and in some examples in the range of 0″ to 1″.

FIG. 3A illustrates linear actuator 234 driving spades 230 into soil 300 at a first location 310 of the soil to an inserted position. As will be appreciated, the depth of insertion may be varied depending on the specific application. After spades 230 are inserted, closing mechanism 232 may be activated to close spades 230 together to capture a first volume or plug of soil between the spades and linear actuator 234 may be powered to retract elongate member 236, to the position shown in FIG. 3B. In one example, spades 230 are configured to remove a first volume of soil that leaves a recess in the soil having a depth of approximately 1″ to 4″ and in some examples, approximately 1″ to 3″ and in some examples, approximately 1″ to 2″. As shown in FIG. 3B, with spades 230 in the closed position and linear actuator 234 in a retracted position, sleeve 212 may be extended into the soil 300 by a first distance, D1, below the surface 308 of the soil, for example a distance, D1, of 1″ to 6″ and in some examples, 1″ to 4″ and in some examples, approximately 3″. As shown in FIG. 3C, with sleeve 212 in the extended position and inserted into the soil, tool 206 may be driven into the soil by driving mechanism 220 a second distance, D2, that may be equal to or greater than the first distance, D1. For example, distal end 208 of tool 206 may be driven below surface 308 of soil a distance, D2, of 2″ to 12″ and in some examples, 3″ to 10″ and in some examples, approximately 6″.

Figure 3D:
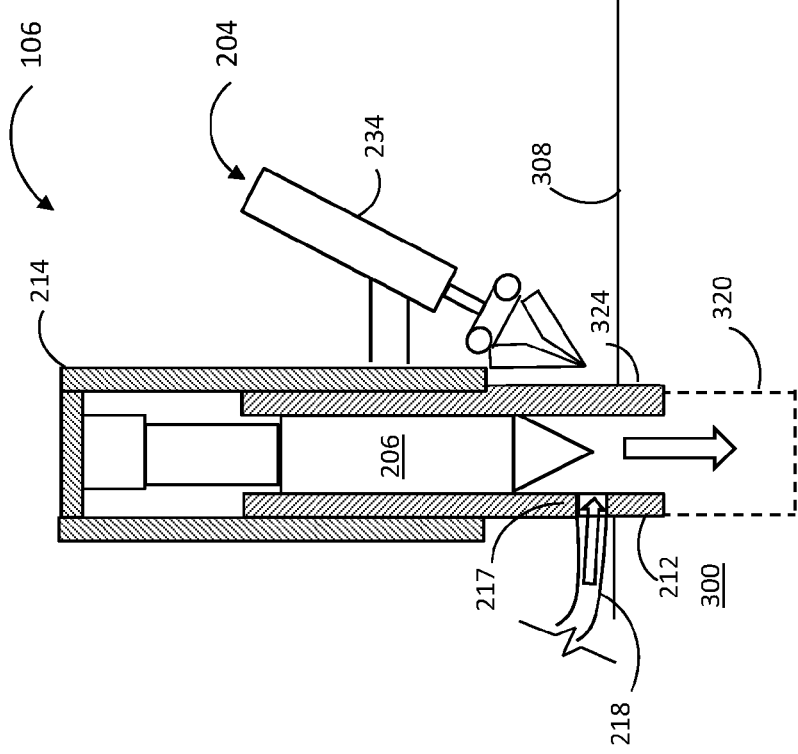

As shown in FIG. 3D, after driving tool 206 into the soil, the tool can then be retracted back into housing 214, leaving a recess 320 in soil 300. As noted above, soil conditioner hose 218 is coupled to sleeve 212 at an opening 217 in a sidewall 324 of the sleeve. With sleeve 212 still in the extended position and inserted in the soil 300, a pump coupled to slurry tank (FIG. 1) can be activated (and/or one or more valves coupled to hose 218 opened) to deliver pressurized soil conditioner through hose 218, into sleeve 212, and into recess 320 in the soil. By maintaining sleeve 212 in the extended and inserted position in the soil 300 as shown, pressurized soil conditioner can be effectively delivered into and maintained within recess 320 and not inadvertently sprayed across the top surface 308 of the soil.

As shown in FIG. 3E, with soil conditioner 326 injected in recess 320 of the soil 300, sleeve 212 can be retracted back into housing 214 transitioning hammer 202 back to its initial suspended position above the soil. SPR 204 can then be activated, to first extend elongate member 236 to position spades 230 above the first location 310 in the soil and then closing mechanism 232 can be activated to open the spades to allow soil plug 330 to drop on the first location 310. Linear actuator 234 can then retract the elongate member into the retracted position. Importantly, with the soil plug 330 positioned over recess 320 and the injected soil conditioner 326, the soil plug effectively seals the injected soil conditioner within recess 320, thereby minimizing or substantially preventing runoff. System 100 (FIG. 1) can then be advanced to a new position so that the steps illustrated in FIGS. 3A-3E can be performed again to inject soil conditioner in new locations. In some examples, system 100 may include a tamping mechanism that is configured to tamp down each of soil plugs 330. For example, a portion of sled 108 may slide along the ground and be pulled across each location where an injector 106 has injected soil conditioner as the system is advanced to a new injection location. In some examples, sled 108 may also be configured to vibrate to further facilitate tamping and sealing of soil plug 330 in recess 320 to seal the soil conditioner in the recess.

Figure 4:
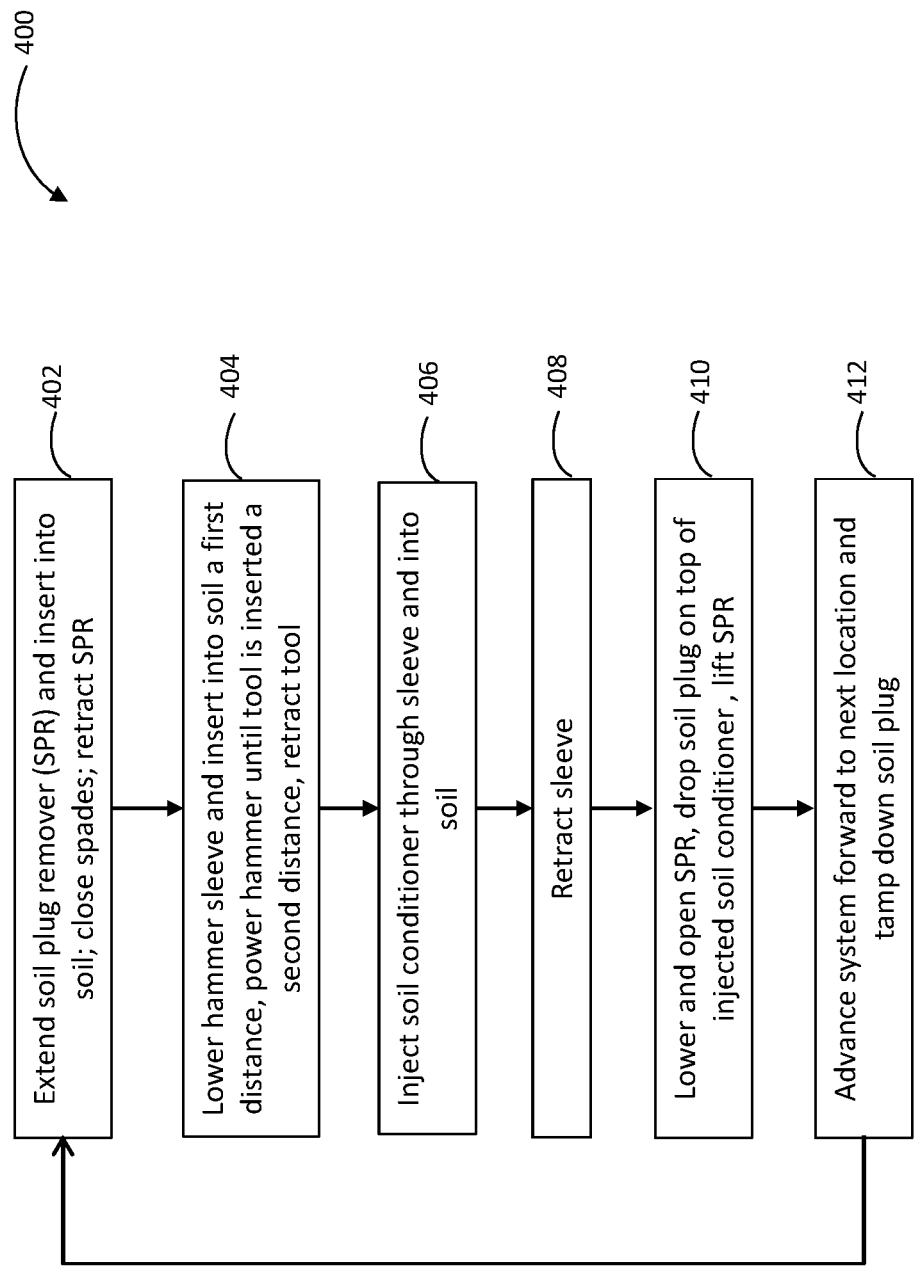
FIG. 4 illustrates steps of a method of injecting soil conditioner that may be performed by systems made in accordance with the present disclosure.

FIG. 4 illustrates an example method of controlling a soil conditioner injection system, for example, control of injection system 100 by controller 250 to control, e.g., simultaneously, the injection of soil conditioner at a plurality of locations by a plurality of injectors, such as injectors 106. Method 400, may include, at block 402, a soil plug removal step that may include extending a soil plug remover, such as SPR 204, and inserting a portion of the SPR into soil, closing one or more spades of the SPR to capture a first volume of soil, and then retracting the first volume of soil from the ground. Block 404 may include a recess forming step that may include lowering a hammer sleeve, such as sleeve 212 of hammer 202 to insert an end of the sleeve a first distance into soil. Block 404 may also include powering a hammer to drive a tool of the hammer in the soil a second distance, and then retracting the tool.

At block 406, soil conditioner may be injected through the sleeve and into the soil, and at block 408, the sleeve can then be retracted. At block 410, a step of replacing the removed soil plug to seal the soil conditioner can be performed by, for example, lowering and opening a portion of the SPR to thereby drop the first volume of soil on the location where the soil conditioner was injected, and then lifting the SPR back to the retracted position. And at block 412, the system can be simultaneously advanced forward to a next location while also tamping down the deposited soil plug to thereby seal the injected soil conditioner in the soil. Blocks 402 to 412 can then be repeated at the next injection location.

The foregoing has been a detailed description of illustrative embodiments of the invention. It is noted that in the present specification and claims appended hereto, conjunctive language such as is used in the phrases "at least one of X, Y and Z" and "one or more of X, Y, and Z," unless specifically stated or indicated otherwise, shall be taken to mean that each item in the conjunctive list can be present in any number exclusive of every other item in the list or in any number in combination with any or all other item(s) in the conjunctive list, each of which may also be present in any number. Applying this general rule, the conjunctive phrases in the foregoing examples in which the conjunctive list consists of X, Y, and Z shall each encompass: one or more of X; one or more of Y; one or more of Z; one or more of X and one or more of Y; one or more of Y and one or more of Z; one or more of X and one or more of Z; and one or more of X, one or more of Y and one or more of Z.

Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve aspects of the present disclosure. Accordingly, this description is meant to be taken only by way of example, and not to otherwise limit the scope of this invention.

What is claimed is:

1. A soil conditioner injector, comprising:
a sleeve having a longitudinal axis, the sleeve slidably configured to move between a retracted position and an extended position for insertion into soil;
a tool slidably disposed in the sleeve;
a driving mechanism configured to drive the tool in a direction parallel to the longitudinal axis to form a recess in the soil;
wherein the sleeve is configured to convey pressurized soil conditioner into the recess formed in the soil; and
a soil plug remover (SPR) positioned adjacent the sleeve, the SPR configured and dimensioned to move between a first position adjacent the sleeve and a second position for insertion into soil and removal of a first volume of soil.

2. The injector of claim 1, further comprising a soil conditioner hose extending between the sleeve and a soil conditioner slurry tank.

3. The injector of claim 1, wherein a portion of the SPR intersects the longitudinal axis when the SPR is in the second position.

4. The injector of claim 1, wherein the SPR includes a spade that at least partially defines a soil plug enclosure, wherein the SPR further includes a closing mechanism configured to transition the soil plug enclosure between an open and closed configuration.

5. The injector of claim 1, wherein the SPR includes a pair of opposed spades configured to be inserted into soil, articulating arms coupled to the spades, and an actuator configured to move the articulating arms between first and second positions to thereby open and close the spades.

6. A system, comprising:
at least one soil conditioner injector, including:
a soil plug remover (SPR) configured to remove a first volume of soil from a first location; and
a sleeved hammer configured to form a recess in soil at the first location and inject soil conditioner into the recess;
wherein the SPR is configured to deposit the first volume of soil on the injected soil conditioner to thereby substantially seal the soil conditioner in the recess;
wherein the sleeved hammer includes a sleeve configured to move between a retracted position and an extended position for insertion into soil;
wherein the sleeve includes an opening in a sidewall of the sleeve for passage of soil conditioner therethrough, the sleeve configured to direct the soil conditioner into the recess in soil formed by the sleeved hammer.

7. The system of claim 6, wherein the SPR is disposed at an angle and adjacent the sleeved hammer, a distal end of the SPR configured to move between a retracted position adjacent a central longitudinal axis of the sleeve and an extended position where the distal end intersects the central longitudinal axis.

8. The system of claim 6, wherein the at least one soil conditioner injector includes a plurality of the soil conditioner injectors structurally supported by a frame, the system further comprising a control system configured to simultaneously operate each of the injectors for simultaneously injecting soil conditioner into soil at a plurality of locations.

9. The system of claim 8, further comprising a soil conditioner slurry tank coupled to the frame and a plurality of soil conditioner hoses extending from the tank to corresponding ones of the soil conditioner injectors.

10. A method of injecting a soil conditioner into soil, comprising:
removing a first volume of soil from a first location with a soil plug remover (SPR) coupled to a sleeved hammer, wherein the sleeved hammer includes a sleeve and a tool disposed in the sleeve;
inserting the sleeve of the sleeved hammer into soil at the first location;
driving the tool of the sleeved hammer into the soil to form a recess;
retracting the tool towards a proximal end of the sleeve;
injecting soil conditioner through the sleeve and into the recess; and
depositing the first volume of soil on the injected soil conditioner to thereby substantially seal the soil conditioner in the recess.

11. The method of claim 10, wherein the inserting the sleeve includes extending the sleeve from a retracted position within a housing of the sleeved hammer to an extended position to thereby insert a distal end of the sleeve into the soil a first distance.

12. The method of claim 11, wherein the driving step includes driving a distal end of the tool into the soil a second distance that is greater than the first distance.

13. A system, comprising:
at least one soil conditioner injector, including:
a soil plug remover (SPR) configured to remove a first volume of soil from a first location; and
a sleeved hammer configured to form a recess in soil at the first location and inject soil conditioner into the recess;
wherein the SPR is configured to deposit the first volume of soil on the injected soil conditioner to thereby substantially seal the soil conditioner in the recess;
wherein the sleeved hammer includes a sleeve configured to move between a retracted position and an extended position for insertion into soil;
wherein the SPR is disposed at an angle and adjacent the sleeved hammer, a distal end of the SPR configured to move between a retracted position adjacent a central longitudinal axis of the sleeve and an extended position where the distal end intersects the central longitudinal axis.

14. The system of claim 13, wherein the sleeve includes an opening in a sidewall of the sleeve for passage of soil conditioner therethrough, the sleeve configured to direct the soil conditioner into the recess in soil formed by the sleeved hammer.

15. The system of claim 13, wherein the at least one soil conditioner injector includes a plurality of the soil conditioner injectors structurally supported by a frame, the system further comprising a control system configured to simultaneously operate each of the injectors for simultaneously injecting soil conditioner into soil at a plurality of locations.

16. The system of claim 15, further comprising a soil conditioner slurry tank coupled to the frame and a plurality of soil conditioner hoses extending from the tank to corresponding ones of the soil conditioner injectors.

* * * * *